(12) United States Patent
Zawilinski et al.

(10) Patent No.: US 7,871,240 B2
(45) Date of Patent: Jan. 18, 2011

(54) HELICAL SPRING DAMPER

(75) Inventors: David Zawilinski, West Granby, CT (US); W. Clark Dean, Simsbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1543 days.

(21) Appl. No.: 10/930,329

(22) Filed: Aug. 31, 2004

(65) Prior Publication Data
US 2005/0263946 A1    Dec. 1, 2005

Related U.S. Application Data

(60) Provisional application No. 60/506,629, filed on Sep. 26, 2003.

(51) Int. Cl.
*F16F 13/04* (2006.01)
*F01D 25/08* (2006.01)
(52) U.S. Cl. .................. 415/117; 415/175; 267/169; 251/64
(58) Field of Classification Search .............. 415/116, 415/117, 175, 176, 177, 178; 251/64; 267/135, 267/169, 174, 201, 202, 204, 214
See application file for complete search history.

(56) References Cited

U.S. PATENT DOCUMENTS

| | | | | | |
|---|---|---|---|---|---|
| 1,928,678 | A | * | 10/1933 | Sjolander | 267/135 |
| 2,040,435 | A | * | 5/1936 | Griswold | 267/135 |
| 2,136,908 | A | * | 11/1938 | Pierce et al. | 267/204 |
| 3,602,205 | A | * | 8/1971 | Turkish | 123/90.65 |
| 5,351,732 | A | * | 10/1994 | Mills et al. | 415/175 |
| 6,910,851 | B2 | * | 6/2005 | Franconi et al. | 415/115 |

\* cited by examiner

*Primary Examiner*—Edward K. Look
*Assistant Examiner*—Nathaniel Wiehe
(74) *Attorney, Agent, or Firm*—Carlson, Gaskey & Olds, P.C.

(57) ABSTRACT

A damped spring assembly includes a helical spring. The helical spring is movable along an axis and has a winding direction. A damper is movable along the axis and includes a helical shape. The damper is wound in a direction opposite the winding direction. The damper applies a radial load to the spring for damping movement of the spring along the axis as the spring vibrates. The damper has a very low axial spring rate and it contributes very little to the axial load provided by the spring.

15 Claims, 3 Drawing Sheets

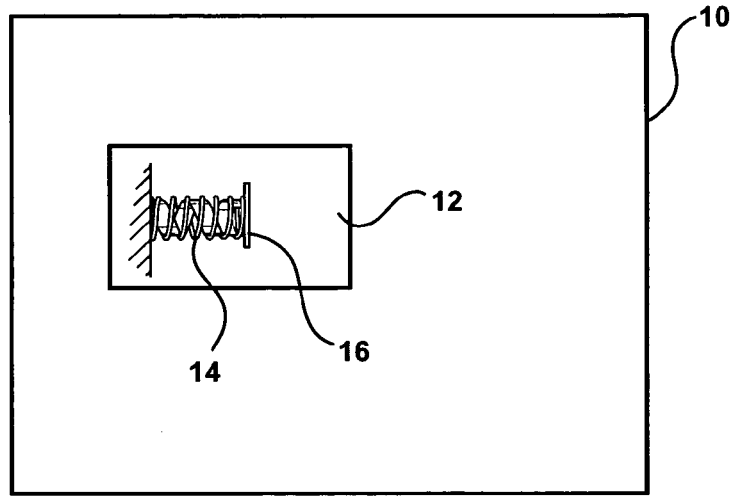
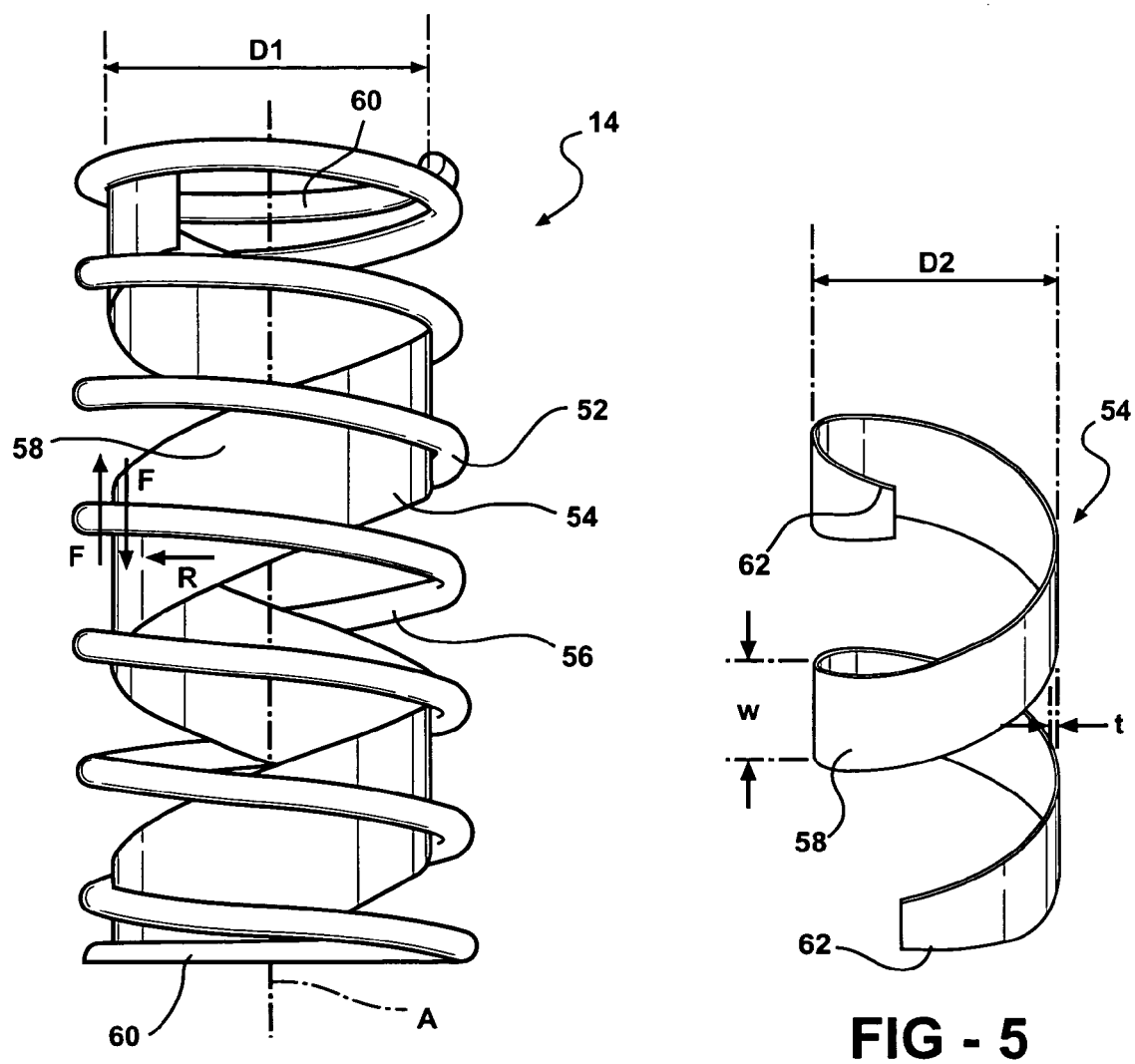

HELICAL SPRING DAMPER

The application claims priority to U.S. Provisional Application No. 60/506,629, which was filed on Sep. 26, 2003.

BACKGROUND OF THE INVENTION

Helical springs used in aircraft systems may be subjected to high cyclical stresses at the natural frequency of the spring. This can occur when the natural frequency is within the operating frequency of the aircraft system. In one example, a particular turbine may operate at frequency of approximately 135 Hz. A helical spring used in a turbine case cooling valve has a natural frequency within the operating frequency of the turbine. As a result, the spring is subjected to vibratory stresses that can contribute to fatigue and ultimately failure of the spring. Failure of the spring can adversely effect the operational efficiency of the turbine.

A turbine case cooling valve regulates the flow of a cooling fluid to the turbine case to maintain a desired clearance between the turbine blades and turbine case. Vibration of the spring at its natural frequency over time can fatigue and break the spring causing a malfunction of the turbine case cooling valve.

Tube or coulomb dampers have been used in conjunction with helical springs to damp and reduce the vibratory response of the spring. However, these dampers apply a frictional force during all helical spring operation causing unwanted wear and hysteresis of the spring.

Helical springs in other aircraft systems and non-aircraft systems may also be subject to the damaging cyclical stresses described above. What is needed is a damped spring assembly capable of reducing resonance of a helical spring and/or its vibratory response to an acceptable level thereby eliminating spring fatigue failures by reducing the cyclical stress on the spring.

SUMMARY OF THE INVENTION AND ADVANTAGES

The present invention relates to a damped spring assembly having a helical spring. The helical spring is movable along an axis and has a winding direction. A damper is movable along the axis and includes a helical shape, as one example. The damper is wound in a direction opposite the winding direction of the helical spring. The damper applies a radial load to the spring for damping movement of the spring along the axis.

The damped spring assembly is suitable for use in an aircraft system such as a turbine. The turbine includes an aircraft component such as a turbine case cooling valve having a piston that is biased by the spring of the damping arrangement. The spring biases the piston in a desired direction. The spring provides a spring rate for generating an axial load on the piston. The damper has a very low axial spring rate and it contributes very little to the axial load generated on the piston. Instead, the damper exerts a radial load on the spring generating a friction force that damps the movement of the spring, and, in particular, damping the axial movement of the spring at a natural frequency of the spring.

These and other features of the present invention can be best understood from the following specification and drawings, of which the following is a brief description.

BRIEF DESCRIPTION OF THE DRAWINGS

FIG. 1 is a schematic view of an aircraft system with an aircraft component utilizing the inventive damped spring assembly.

FIG. 4 is a perspective view of the inventive damped spring assembly with an inventive damper in radial compressed state.

FIG. 5 is a perspective view of the damper in a radial uncompressed state.

DETAILED DESCRIPTION OF THE PREFERRED EMBODIMENT

A highly schematic view of an aircraft system 10 is shown in FIG. 1. The aircraft system 10 includes an aircraft component 12 having an inventive damped spring assembly 14. The damped spring assembly 14 exerts a spring load on a biased member 16. Although the inventive damped spring assembly 14 is described relative to an aircraft system 10, it should be understood that the damped spring assembly 14 may be used in any type of system, such as an automotive system or any other suitable application.

Figure 2:
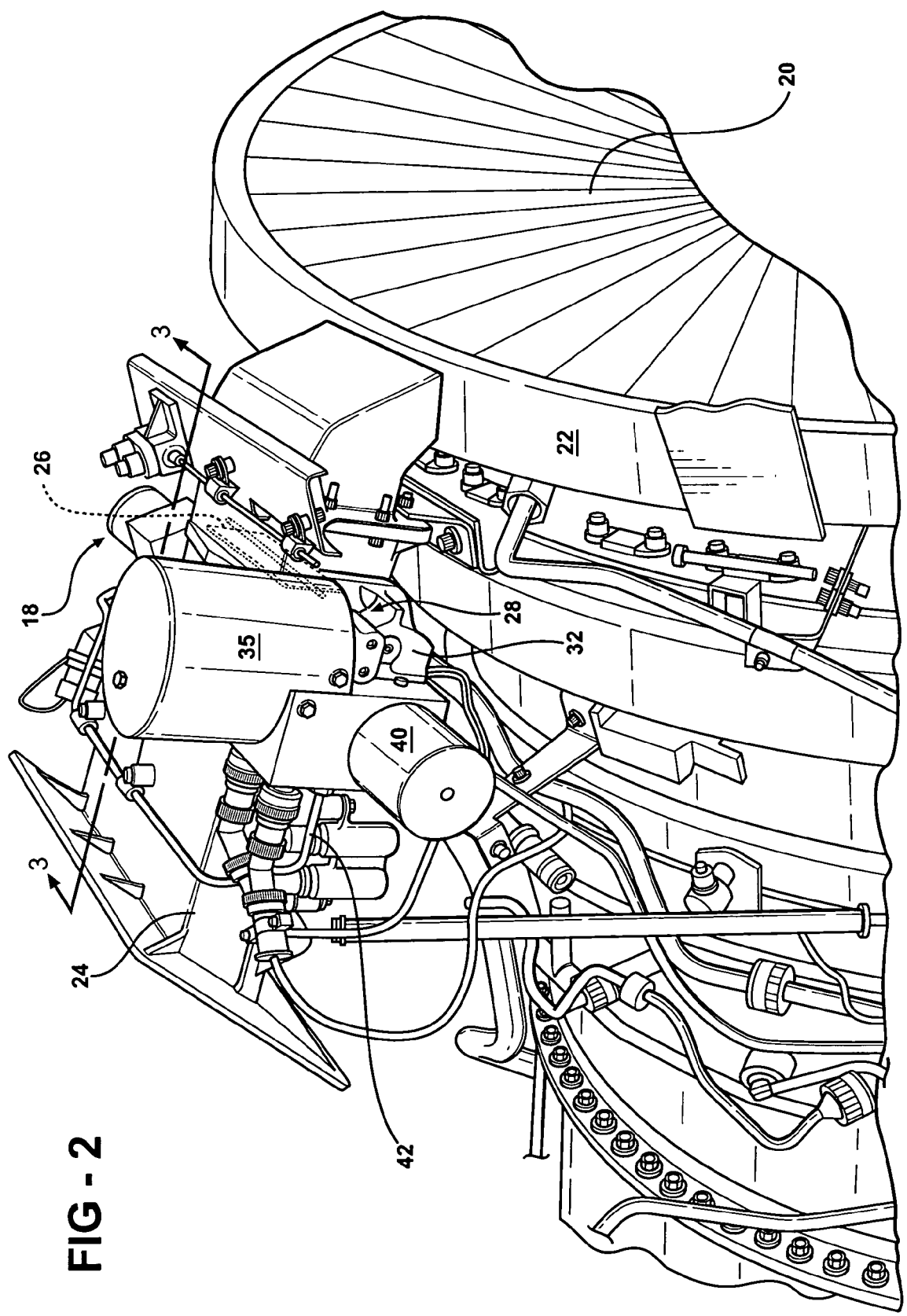
FIG. 2 is a partial perspective view of a turbine and a turbine case cooling valve utilizing the inventive damped spring assembly.

A turbine engine 18 is shown in FIG. 2 as one suitable application for the inventive damped spring assembly 14. The turbine engine 18 includes a turbine housing 22 with turbine blades 20 rotatable within and relative to the housing 22. A turbine case cooling valve 28 controls the flow of a cooling fluid into the turbine housing 22 through a cooling inlet passage 24. The turbine housing 22 is selectively cooled with the fluid to control the clearance between the turbine housing 22 and turbine blades 20. Excess clearance between the blades 20 and housing 22 can adversely impact the efficiency the turbine engine 18. Conversely, insufficient clearance between the blades 20 and housing 22 can result in a collision of the blades 20 into the housing 22 resulting in a catastrophic failure of the turbine engine 18.

Figure 3:
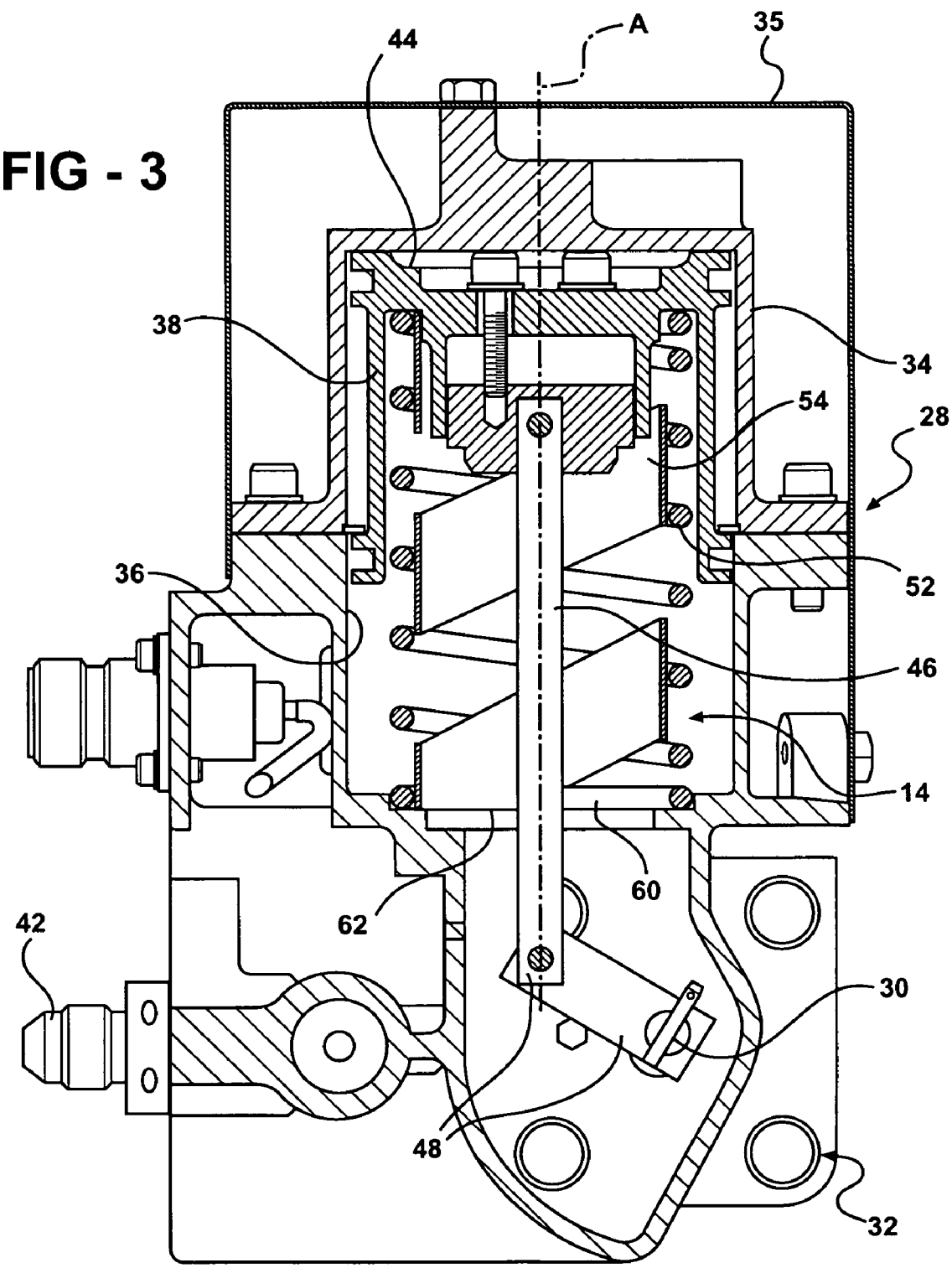
FIG. 3 is a cross-sectional view of the turbine case cooling valve.

Referring to FIGS. 2 and 3, the turbine case cooling valve 28 includes solenoid 40 that controls the flow of an actuating fluid into the turbine case cooling valve 28 to open and close a butterfly valve 26 situated in the cooling inlet passage 24. The butterfly valve 26 is supported by a shaft 30 rotatably supported in a base 32 of the turbine case cooling valve 28. A cap 34 is secured to the base 32, and together the base 32 and cap 34 provide a bore 36, which is best shown in FIG. 3. An insulating tube 35 is secured over the cap 34.

A piston 38 is movable along an axis A within the bore 36. A solenoid 40 controls the flow of fluid into the turbine case cooling valve 28 through an air passage 42 to act on a top surface 44 of the piston 38. A rod 46 is connected to the piston 38 and to the shaft 30 by a lever 48.

The inventive damped spring assembly 14 is arranged between the base 32 and the piston 38 to bias the piston 38 in a desired direction. In the arrangement shown, the damped spring assembly 14 biases the piston 38 in a direction opposite to the direction which piston 38 is urged by the air acting upon the surface 44. That is, the air acting on the surface 44 must overcome the axial spring load generated on the piston 38 by the damped spring assembly 14. For the example turbine case cooling valve 28 shown, the butterfly valve 26 is closed with the solenoid 40 off and the damped spring assembly 14 extended, as shown in FIG. 3. Conversely, the butterfly valve 26 is open with the solenoid 40 on and the damped spring assembly 14 compressed by the pressurized air acting upon the surface 44.

A typical turbine case cooling valve 28 includes a single helical spring 52 that acts as an axial biasing member on the piston 38 along the axis A. The helical spring 52 has a natural frequency within the operating range of the turbine engine 18 causing the spring 52 to resonate, which creates cyclical stresses causing fatigue and premature failure of the helical spring 52. To this end, a damper 54 is used as a radial biasing member along with the helical spring 52 to form the inventive damped spring assembly 14.

The helical spring 52 has a helical winding in one direction. The damper 54 is helical in shape in the example shown and has a wound direction that is opposite of the winding direction of the coil spring 52 to prevent the spring 52 and damper 54 from interlocking as the spring 52 and damper 54 are compressed axially. The spring 52 preferably reaches a solid height prior to the damper 54 so that the damper 54 does not interfere with the axial compression of the spring 52.

The spring 52 and damper 54 are shown coaxial with one another and coaxial with the axis A along which the piston 38 moves. The spring 52 has a circular cross-section in the example shown. The damper 54 is a thin, wide member wound such that it does not generate a significant axial load on the piston 38. Yet another way, the coil spring 52 has a axial spring rate, and the damper 54 has a second axial spring rate that is significantly less than the first axial spring rate. Preferably, the axial spring rate of the damper 54 is less than approximately 10 percent of the first axial spring rate. More preferably, the second axial spring rate is less than 5 percent of the first axial spring rate. Said yet another way, it is desirable that the axial spring rate of the damper 54 be negligible resulting in minimal hysteresis to the spring 52. In this manner, unlike many prior art coaxial spring arrangements, the damper does not contribute significantly to the axial spring rate of the spring 52.

It is preferable that the axial spring rate of the damper 54 be minimized to the greatest extent possible while taking into consideration the other objects of the damper 54. While particular percentages are given for the second axial spring rate relative to the first axial spring rate, other percentages may be used to achieve desired results. The spring 52 need only be damped by the damper 54 to the degree desired to prevent undesired fatigue of the spring 52 by lowering the natural frequency and vibratory response of the spring 52 below the operating frequency of the turbine engine 18.

Referring to FIGS. 4 and 5, the damper 54 has a diameter D1 in a compressed state (FIG. 4) and a diameter D2 in an uncompressed state (FIG. 5). The diameter D2 is greater than the diameter D1. The diameter D2 must be compressed radially inward from the uncompressed state shown in FIG. 5 to install the damper 54 into the coil spring 52, as shown in FIG. 4. In one example embodiment, the damper 54 is compressed approximately 10-15 percent from the radial uncompressed state to the radial compressed state.

The coil spring 52 has an inner surface 56, and the damper 54 has an outer surface 58. In the arrangement shown in FIG. 4 in which the damper is arranged internally relative to the coil spring 52, the inner and outer surfaces 56 and 58 engage one another. The damper 54 generates a radial load R on the spring 52 thereby generating friction forces F between the inner and outer surfaces 56 and 58 as the spring 52 and damper 54 move axially under vibration. These friction forces F damp the vibratory response of the spring 52.

To minimize the axial load provided by the damper 54 and ensure that frictional forces F are generated throughout the compression and extension of the damped spring assembly 14, the damper 54 is constructed from a coil member having a thickness T that is significantly less than a width W. The example damper 54 has a rectangular cross-section. This ensures that the damper 54 has very little axial rigidity, while ensuring that a desired radial load is achieved sufficient for the desired amount of damping.

The coil spring 52 and damper 54 respectively include planar surfaces 60 and 62 to better distribute the axial load generated by the spring 52 between the base 32 and piston 38. The planar surface 62 on the damper 54 better ensures that the damper 54 will not become cocked relative to the spring 52 as it is compressed.

One example material for the spring 52 and damper 54 is 17-7pH. It is desirable to select materials that do not wear excessively since the spring 52 and damper 54 are in frictional engagement with one another. In the example of the turbine case cooling valve 28, it is desirable that the radial load applied by the damper 54 onto the spring 52 remain relatively constant over the life of the damped spring assembly.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An aircraft damped spring assembly comprising:
   an aircraft system including an aircraft component, the aircraft component having a movable member and a spring biasing the movable member in a desired direction;
   a damper coacting with the spring to apply a damping load transverse to the desired direction, wherein the aircraft system includes an operating frequency, the spring includes a natural frequency near the operating frequency, and the damper reduces natural frequency below the operating frequency with the damping load;
   wherein the spring is a helical coil spring and the desired direction is an axis of the spring, and the damper applies the damping load to the spring in a radial direction the spring and damper having a cylindrical shape; and
   wherein the damper is in engagement with the spring generating a friction force on the spring to damp the spring.

2. The damped spring assembly of claim 1, wherein the aircraft system is a turbine engine, and the aircraft component is a turbine case cooling valve.

3. The damped spring assembly of claim 2, wherein the movable member is a piston having a fluid acting on the piston to move the piston in a direction opposite the desired direction.

4. The damped spring assembly of claim 3, wherein the spring is a helical coil spring having a winding direction, and the damper is helical in shape and wound in a direction opposite the winding direction.

5. The damped spring assembly of claim 4, comprising a solenoid for providing a fluid to move the piston to an open position opposite the direction.

6. An aircraft damped spring assembly comprising:
   an aircraft system including an aircraft component, the aircraft component having a movable member and a spring biasing the movable member in a desired direction; and
   a damper coacting with the spring to apply a damping load transverse to the desired direction, wherein the aircraft system includes an operating frequency, the spring includes a natural frequency near he operating frequency, and the damper reduces natural frequency below the operating frequency with the damping load, wherein the spring and damper are coaxial with one another.

7. An aircraft damped spring assembly comprising:

an aircraft system including an aircraft component, the aircraft component having a movable member and a spring biasing the movable member in a desired direction;

a damper coacting with the spring to apply a damping load transverse to the desired direction, wherein the aircraft system includes an operating frequency, the spring includes a natural frequency near the operating frequency, and the damper reduces natural frequency below the operating frequency with the damping load, wherein the damper is arranged interiorly of the spring.

8. An aircraft damped spring assembly comprising:

an aircraft system including an aircraft component, the aircraft component having a movable member and a spring biasing the movable member in a desired direction; and a damper coacting with the spring to apply a damping load transverse to the desired direction, wherein the aircraft system includes an operating frequency, the spring includes a natural frequency near the operating frequency, and the damper reduces natural frequency below the operating frequency with the damping load;

wherein the spring is a helical coil spring and the desired direction is an axis of the spring, and the damper applies the damping load to the spring in a radial direction the spring and damper having a cylindrical shape; and wherein the damper is helical in shape and wound in a direction opposite of a winding direction of the spring.

9. A damped spring assembly comprising:

a helical spring movable along an axis and having a winding direction;

a damper movable along the axis and including a cylindrical helical shape, the damper wound in a direction opposite the winding direction, the damper applying a radial load to the spring for damping movement of the spring along the axis;

wherein the spring includes a first axial spring rate and the damper includes a second axial spring rate, the second spring rate substantially less that the first spring rate; and wherein the second spring rate is less than approximately 10% of the first spring rate with the spring and the damper in an assembled state.

10. The damped spring assembly of claim 9, wherein spring and damper are coaxial with one another and include heights approximately the same as one another.

11. The damped spring assembly of claim 10, wherein the damper includes a compressed and uncompressed stated, the damper coaxial with and applying the radial load to the spring in the compressed state in which the spring and the damper are in the assembled state, the damper having a diameter of approximately 10-15% less than that of a diameter of the damper in the uncompressed state.

12. The damped spring assembly of claim 10, wherein the damper engages the spring and generates a friction force between the spring and damper, wherein opposing ends of the damper each include planar surfaces axially aligning the damper relative to the spring.

13. The damped spring assembly of claim 12, wherein the damper is arranged interiorly of the spring.

14. The damped spring assembly of claim 9, wherein the spring is a coil spring having a generally circular cross-section, and the damper is generally rectangular in shape having a width substantially greater that a thickness, a surface defined by the width engaging the spring.

15. The damped spring assembly of claim 9, wherein the spring becomes excited at a natural frequency, the radial load damps the spring at the natural frequency.

* * * * *